United States Patent [19]
Hodgson

[11] Patent Number: 6,128,422
[45] Date of Patent: Oct. 3, 2000

[54] ALL FIBER POLARIZATION SPLITTING SWITCH

[75] Inventor: Craig W. Hodgson, Thousand Oaks, Calif.

[73] Assignee: The Board of Trustees of the Leland Stanford Junior University, Stanford, Calif.

[21] Appl. No.: 09/307,091

[22] Filed: May 7, 1999

Related U.S. Application Data

[63] Continuation of application No. 08/906,559, Aug. 5, 1997, Pat. No. 5,943,453
[60] Provisional application No. 60/036,587, Mar. 14, 1997.

[51] Int. Cl.[7] .................................................. G02B 6/28
[52] U.S. Cl. ........................ 385/11; 385/16; 385/24; 385/37
[58] Field of Search ............................. 385/24, 16, 37, 385/147, 11; 359/122, 124, 127, 128, 130, 156, 160

[56] References Cited

U.S. PATENT DOCUMENTS

| | | | |
|---|---|---|---|
| 4,872,738 | 10/1989 | Risk et al. | 359/285 |
| 5,297,224 | 3/1994 | Shaw | 385/12 |
| 5,317,658 | 5/1994 | Bergland et al. | 385/16 |
| 5,428,697 | 6/1995 | Dolfi et al. | 385/4 |
| 5,703,975 | 12/1997 | Miller et al. | 385/16 |
| 5,793,905 | 8/1998 | Maier et al. | 385/16 |
| 5,943,453 | 8/1999 | Hodgson | 385/16 |

FOREIGN PATENT DOCUMENTS

| | | |
|---|---|---|
| 63-157133 | 6/1988 | Japan . |
| 04025821 | 1/1992 | Japan . |

OTHER PUBLICATIONS

William P. Risk, III, Fiber–Optic Modulators Using Acoustically–Induced Polarization Coupling, *Doctoral Dissertation*, Stanford University, Jun. 1986.

A. Mecozzi, et al., All–optical switching and intensity discrimination by polarization instability in periodically twisted fiber filters, *Optics Letters*, vol. 12, No. 4, Apr. 1987, pp. 275–277.

S. Trillo, et al., Picosecond nonlinear polarization switching with a fiber filter, *Applied Physics Letters*, vol. 53, No. 10, Sep. 5, 1988, pp. 837–839.

Stefano Trillo, et al., Observation of Ultrafast Nonlinear Polarization Switching Induced by Polarization Instability in a Birefringent Fiber Rocking Filter, *IEEE Journal of Quantum Electronics*, vol. 25, No. 1, Jan. 1989, pp. 104–112.

(List continued on next page.)

*Primary Examiner*—Hung N. Ngo
*Attorney, Agent, or Firm*—Knobbe, Martens, Olson & Bear, LLP

[57] ABSTRACT

An all-optical polarization splitting switch of the Mach-Zehnder type includes a polarization maintaining fiber, an optical input signal, an optical pump signal, two polarization cross couplers, and a polarization splitting coupler. The polarization maintaining fiber carries the optical signal and the optical pump signal while maintaining polarization orientation. The first polarization cross coupler splits the optical signal into two portions having mutually perpendicular polarization states which have approximately equal power. The optical pump signal, when present, changes the phase of the first portion of the optical signal with respect to the second portion of the optical signal. The second polarization cross coupler combines all the optical power into a combined optical signal. The polarization splitting coupler couples the combined optical signal into a first output port or a second output port in accordance with the polarization state of the combined signal. This configuration eliminates many of the signal phase discrepancies that occur due to thermal instability and unequal fiber lengths which the Mach-Zehnder type switch exhibits. One application for this invention is a polarization splitting switch for a distributed sensor array.

20 Claims, 5 Drawing Sheets

OTHER PUBLICATIONS

Toshio Morioka, et al., All–optical ultrafast nonlinear switching utilizing the optical Kerr effect in optical fibers, *Optical Engineering*, vol. 29, No. 3, Mar. 1990, pp. 200–209.

F. Bilodeau, et al., Efficient Narrowband $LP_{01}$–$LP_{02}$ Mode Convertors Fabricated in Photosensitive Fibre: Spectral Response, *Electronics Letters*, vol. 27, No. 8, Apr. 11, 1991, pp. 682–684.

K.O. Hill, et al., Birefringent Photosensitivity in Monomode Optical Fiber: Application to External Writing of Rocking Filters, *Electronics Letters*, vol. 27, No. 17, Aug. 15, 1991, pp. 1548–1550.

R. Kashyap, et al., Wideband Gain Flattened Erbium Fibre Amplifier Using a Photosensitive Fibre Blazed Grating, *Electronics Letters*, vol. 29, No. 2, Jan. 21, 1993, pp. 154–156.

K.O. Hill, et al., Brag grating fabricated in monomode photosensitive optical fiber by UV exposure through a phase mask, *Applied Physics Letters*, vol. 62, No. 10, Mar. 8, 1993, pp. 1035–1037.

*Product Data 917P, 918P, Polarizers, Polarization Splitters*, Canadian Instrumentation and Research Limited product brochure, Rev. Jul. 1994.

ALL FIBER POLARIZATION SPLITTING SWITCH

RELATED APPLICATIONS

This is a continuation of Ser. No. 08/906,559 filed Aug. 5, 1997 which claims priority from U.S. Provisional Patent Application 60/036,587 filed on Mar. 14, 1997.

BACKGROUND OF THE INVENTION

1. Field of the Invention

The present invention relates to optical switches and, in particular, to a polarization splitting switch.

2. Description of the Related Art

Optical switches have applications in integrated optics, fiberoptic communications, and detection systems. Optical switches which utilize light as the switching mechanism rather than using a mechanical mechanism, an electrical mechanism, a thermal mechanism, or the like, are known as all-optical switches. An all-optical switch switches an optical signal from one output port to another. This is accomplished by applying an input pump signal from a pump light source to cause the optical signal to be selectively switched. The switch is responsive to the pump signal to selectively switch the light of the optical signal to one or the other of the output ports.

The basic configuration for a typical all-optical switch is a Mach-Zehnder interferometer which includes a first fiberoptic input arm for receiving an input optical signal and a second fiberoptic input arm for receiving a switching pump signal. The input arms are fused together to form a first coupler which subsequently branches out into two intermediate arms. The first coupler splits the input light signal into equal portions which then enter the two intermediate arms. The two intermediate arms are once again fused to form a second coupler which branches into two output ports. After traveling through the two intermediate arms, the two signals are recombined by the second coupler. If the two signals are in phase at the second coupler, then all the light is coupled into a first one of the two output ports. If the two signals are completely out of phase, then the light is coupled into the other of the two output ports.

A number of difficulties have been encountered in the development and implementation of such all-optical switches. For example, one difficulty with the switch described above is that in the absence of a pump input, the phase bias due to the differing lengths of the two arms must be set to a very precise value (e.g., 0). This requires careful control of the relative length of the two arms to a fraction of a wavelength. For typical arm lengths of many centimeters or more, this has been found to be quite difficult. This problem is typically reduced by applying an external, steady-state phase shift using a phase modulator placed in one of the Mach-Zehnder fiber arms, thus setting the phase bias precisely to its desired value. This technique is well known in the art.

A second problem which has been encountered is that the bias introduced by a phase modulator is highly sensitive to external temperature variations. If the fiber lengths of the arms are not equal, even by only a few hundred wavelengths, and the average temperature of the device is changed, both the indices and the lengths of the two fiber arms change by different amounts which causes the phase difference due to the difference in the lengths of the propagation paths to also change. The differences are caused by the expansions and contractions due to temperature variations which are proportional to the lengths of the fiber so that a longer fiber will expand to a greater length than a shorter fiber, thus causing a phase imbalance. This phase imbalance modifies the signal power splitting ratio at the output ports of the Mach-Zehnder interferometer. Typically, such a change would be exhibited on a time scale comparable to the time it takes for the ambient temperature of the environment of the interferometer to change by a few degrees fahrenheit.

The interferometer is even more sensitive to temperature gradients. For example, if the temperature of the two arms changes by differing amounts due to the temperature gradients between the arms, the signal power splitting ratio at the output ports again changes, but more rapidly.

Both of the above-described temperature-dependent effects, which are present whether the Mach-Zehnder interferometer is pumped or unpumped, are undesirable. In practice, these effects are reduced by making the fiber arms physically as close to each other as possible and by making the fiber arm lengths as equal as possible. However, in general, these measures are not sufficient to keep the Mach-Zehnder interferometer output (in the absence of a pump signal) stable to the degree necessary for many applications.

Therefore, another method which has been employed to actively stabilize the output coupling ratio of the interferometer is to use a control loop wherein the signal at one of the output ports is detected and compared to a reference to generate an error signal proportional to the difference between the reference and the detected output signal. This error signal is then amplified and fed into the same phase modulator that sets the bias so as to apply just enough phase to dynamically zero the error signal.

Although active stabilization of the bias works well, it is cumbersome, it increases the device cost, it requires access to the optical signal, and it leads to technical difficulties when the signal is dynamically switched. Most importantly, active stabilization requires electronic circuitry to run the switch, which is typically not acceptable for sensor array or other applications for which a minimization of electrical connections is desirable.

Another undesirable effect in a Mach-Zehnder interferometer switch is caused by the effects of the input pump power. More specifically, since the pump signal is applied only to one arm, heat is generated within that arm, and heat is not generated in the arm that does not carry the pump power. This temperature differentiation results in a pump-induced thermal phase shift that may cause an imbalance in the coupling ratio for the Mach-Zehnder interferometer when the pump is on. Because this effect is thermal, it is typically slow so that a few microseconds or more are required for this imbalance to vanish after the pump has been turned off. In some applications, this effect can be a significant problem.

In a Mach-Zehnder switch, thermal stability dictates that the two fiber arms have nearly identical lengths in order to minimize the effect of overall temperature changes. If the switch is to operate over a large temperature range (e.g., on the order of tens of degrees Fahrenheit), the splitting ratio of the two couplers forming the Mach-Zehnder interferometer switch should not vary with temperature. Furthermore, as discussed above, temperature gradients should be minimized.

SUMMARY OF THE INVENTION

The object of this preferred embodiment is an improved all-optical Mach-Zehnder type switch which utilizes only one optical fiber. The single fiber is preferably a polarization maintaining (PM) fiber. A design that uses only a single length of fiber, with both arms of the interferometer in the single fiber, has an advantage of reduced sensitivity to environmental effects such as mechanical stress and thermal fluctuations. One application for this invention is a polarization splitting switch used in an all-fiber acoustic sensor array.

One aspect of the present invention is an all fiber polarization splitting switch which comprises a polarization maintaining fiber. The polarization maintaining fiber comprises a signal input port which receives a first optical signal; a pump input port which receives an optical pump signal, wherein the pump signal is selectably present or absent at the pump input port; a first signal output port; and a second signal output port. (The pump input port may be the same as the signal input port. The pump input port may also be the same as one of the signal output ports.) A first polarization cross coupler is formed on the polarization maintaining fiber in optical communication with the optical signal. The first polarization cross coupler separates the optical signal into first and second mutually perpendicular polarization states wherein each polarization state has approximately equal optical power. A second polarization cross coupler is connected in series with the first polarization cross coupler and in optical communication with the optical signal. The second polarization cross coupler selectably recombines the first and second polarization states into a combined optical signal having a first preferred polarization state or a second preferred polarization state in response to the presence or absence of the optical pump signal. A polarization splitting coupler is connected to the polarization maintaining fiber. The polarization splitting coupler couples the combined optical signal to the first output port if the combined optical signal has the first preferred polarized state and couples the combined optical signal to the second output port if the combined optical signal has the second preferred polarization state.

Preferably, the polarization maintaining fiber is an optical fiber constructed as to maintain the polarization state of the optical signal. Also preferably, the first optical signal propagates in a first direction and the optical pump signal propagates in a direction opposite the first direction. Preferably, the polarization cross coupler is formed by a comb structure. In preferred embodiments, the polarization cross coupler is formed by an optical grating. In particularly preferred embodiments, the polarization splitting coupler couples the optical signal to one of the first and second output ports depending on the polarization state of the optical signal. The pump signal is at a different optical wavelength than the signal to be switched, and the polarization splitting coupler does not couple the pump signal.

Preferably, the present invention further includes a pump output port which permits an unused portion of the pump signal to propagate from the switch.

Another aspect of the present invention is a method for switching an optical signal. The method comprises the steps of inputting a polarized optical signal into a polarization maintaining fiber having a first input port; selectively inputting an optical pump signal into a second input port of the polarization maintaining fiber; splitting the optical signal into a first signal portion having a first polarization state and a second signal portion having a second polarization state, the first signal portion having the first polarization state having approximately equal optical power to the second signal portion having the second polarization state; selectively causing a phase change in the first signal portion relative to the second signal portion when the optical pump signal is present; combining the first and second signal portions into a combined optical signal, the combined optical signal having a combined polarization state which depends upon said phase change; and coupling the combined optical signal. The combined optical signal is coupled to a first output port when the combined polarization state results from the phase change when the optical pump signal is present; and is coupled to a second output port when the combined polarization state results from no phase change when the optical pump signal is not present. In one preferred method, the polarization cross coupler is formed by mechanically stressing the polarization maintaining fiber periodically. In an alternative preferred method, the polarization cross coupler is an optical grating written periodically within the polarization maintaining fiber by ultraviolet light from a laser. Preferably, the polarization splitting coupler is used to couple the optical signal to one of the first or second output ports depending on the optical signal polarization state.

BRIEF DESCRIPTION OF THE DRAWINGS

This invention will be more fully understood from the following detailed description of the embodiment thereof together with the drawings in which.

DETAILED DESCRIPTION OF THE PREFERRED EMBODIMENT

Figure 1:
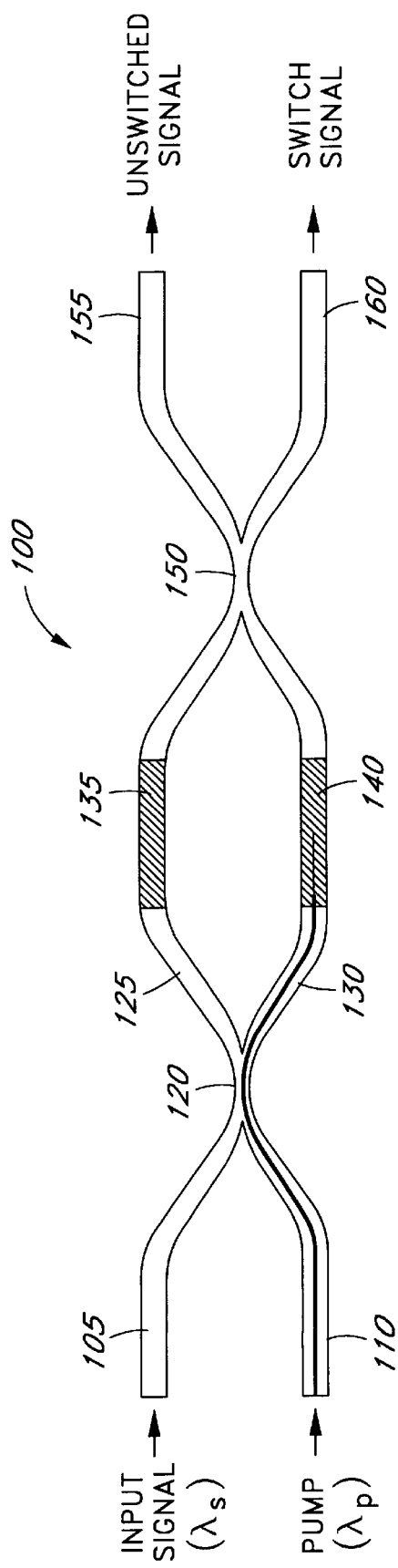
FIG. 1 schematically illustrates an exemplary nonlinear Mach-Zehnder fiber interferometer switch.

The basic configuration for a typical all-optical switch is shown in FIG. 1. The configuration of FIG. 1 is typically referred to as a Mach-Zehnder interferometer. As shown in FIG. 1, the Mach-Zehnder fiber interferometer switch 100 includes a first input arm 105 which receives an input optical signal and includes a second input arm 110 which receives a switching pump signal. The input arms 105, 110 are fused together to form a coupler 120 which branches out into two output arms 125, 130. In certain configurations, portions 135, 140 of the arms 125, 130, respectively, are treated to form nonlinear regions. The arms 125, 130 are once again fused to form a coupler element 150 which branches into output ports 155, 160, respectively.

In the passive form (i.e., a form which does not include or utilize the nonlinear regions 135, 140), the input signal at a wavelength $\lambda_S$ is fed into the input arm 105 and is split equally by the first coupler 120 into first and second portions which enter the two arms 125, 130. After traveling through the respective arms, the two signal portions are recombined by the second coupler 150. If the two portions at the second coupler 150 are in phase (i.e., if their phase difference is equal to zero or a multiple of $2\pi$), they recombine constructively in the top output port 155. That is, all of the signal exits the output port 155. However, if the two signals traveling through the arms 125, 130 are completely out of phase (i.e., if their phase difference is $\pi$, $3\pi$, etc.) when they reach the second coupler 150, then the signals recombine constructively in the bottom output port 160 so that substantially all of the signal exits the bottom port. If the phase difference is intermediate (greater than 0 and less than $\pi$, or greater than $\pi$ and less than $2\pi$), a first portion of the signal will exit the top output port 155, while a second portion of the signal will exit the bottom output port 160, where the ratio of intensities of the output signals is determined by the phase difference between the two signals entering the coupler 150. This principle is well known, and many applications of Mach-Zehnder fiber devices have been reported in the literature using particular fused or polished fiber couplers to form the Mach-Zehnder interferometer fiber switch. For example, Mach-Zehnder type optical switches and their application are illustrated in U.S. Pat. No. 5,297,224.

As briefly discussed above, one present application of a Mach-Zehnder interferometer fiber switch is all-optical switching. According to this application, the regions 135, 140 are made of fiber exhibiting nonlinear effects. For example, some configurations use standard silica fiber (which has an intrinsic Kerr effect) or another doped fiber having a dopant concentration which increases or emphasizes the nonlinear Kerr effect. As is well known in the art, the Kerr effect is a phenomenon which occurs when the refractive index of a fiber carrying an optical signal (at a wavelength of $\lambda_S$, for example) is slightly modified by the signal's own intensity, as well as by other light intensities propagating through the fiber. To accomplish all-optical switching, a pump signal (at a wavelength $\lambda_S$ different from the wavelength $\lambda_S$) is injected into the second port 110. The first coupler 120 is designed to be a wavelength division multiplexer (WDM), such that while the signal at the wavelength $\lambda_S$ is split equally between both arms (i.e., exhibiting a coupling ratio of 50%), the pump, which has the different wavelength, $\lambda_S$, is not coupled to the upper output arm 125 (i.e., exhibiting a coupling ratio of 0%). All of the pump power is thus coupled to the lower output arm 130 of the Mach-Zehnder interferometer.

Due to the nonlinear characteristics of the region 140 of the interferometer 100, the pump power modifies the index of the fiber core in the region 140 of the lower arm 130. The energy from the pump light is absorbed into the fiber region 140, causing electrons within the fiber to enter a higher energy level. This results in a modification of the propagation characteristics of the fiber so that the index of refraction of the fiber core is altered for wavelengths of light including the signal wavelength $\lambda_S$. By changing the index of refraction in the region through which the signal in the lower arm 130 is propagating, an effective change in wavelength of the signal takes place (i.e., from $\lambda_S$ to $\lambda_S \pm \Delta\lambda$). This change of wavelength is effective only over the non-linear region 140, and the signal returns to the wavelength $\lambda_S$ before entering the coupler 150. When taken over the length of the non-linear region 140, the change of wavelength is equivalent to the input signal at wavelength $\lambda_S$ undergoing a nonlinear phase shift $\delta\phi$ in the lower arm 130.

Since the signal in the lower arm 130 undergoes a Kerr-induced wavelength change which is equivalent to a phase shift of $\delta\phi$, while the signal in the upper arm 125 does not undergo a phase shift (since no pump power enters into the upper arm so that the index of refraction of the upper arm remains substantially unchanged), a relative phase shift is induced between the signal in the upper arm 125 and the signal in the lower arm 130. In addition, a constant, relative phase difference is observed between the two signals recombined in the coupler 150 due to any difference in the lengths of the two arms 125, 130. Consequently, where the two signals are recombined by the second coupler 150, their relative phase difference is now $\delta\phi$ plus some constant phase shift due to the difference in length of the propagation paths between the upper arm 125 and the lower arm 130. The sum of $\delta\phi$ and this constant phase difference is referred to hereinafter as $\Delta\phi$.

Under the assumption that, in the absence of a pump input, the phase difference due to the difference in propagation lengths through the arms 125, 130 is calibrated to be zero (i.e., so that substantially all of the input signal comes out of the top output port 155), if the pump power is selected such that $\delta\phi=\pi$, then in the presence of the pump substantially all of the signal power will exit through the bottom port 160 so that the input signal has been effectively switched from the top port 155 to the bottom port 160. It should be noted that this type of switch is not a latching switch since the input signal is switched only as long as the pump power is on. When the pump power is turned off, the signal output returns to the upper port 155 since the non-linearity induced in the lower arm 130 ceases to become a factor.

Figure 2:
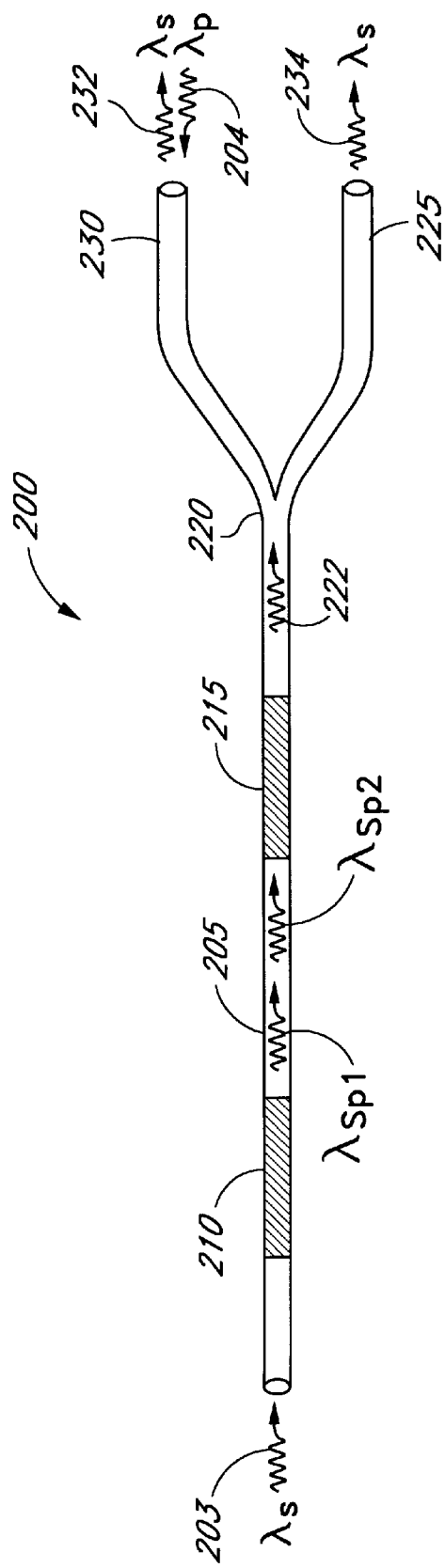
FIG. 2 illustrates the configuration of a Mach-Zehnder polarization splitting switch in accordance with the present invention.

As described above, Mach-Zehnder switches have been designed previously utilizing two separate single mode fibers. In the preferred embodiment of the present invention, a Mach-Zehnder switch comprises only one polarization maintaining fiber (PMF). FIG. 2, illustrates the configuration of a Mach-Zehnder polarization splitting switch (PSS) 200. The PSS 200 comprises a PMF 205 which has two polarization cross couplers (PCC) 210, 215, an intermediary region 218, and a polarization splitting coupler (PSC) 220. The PMF 205 maintains the linear polarization states of the optical signal $\lambda_S$ 203 when launched along the polarization axes of the PMF 205. If the optical signal 203 has both a perpendicular polarization state and a parallel polarization state and is launched into a PMF 205, then the respective polarization states are maintained. The optical signal 203 in a PSS 200 is ideally launched in a single polarization state. The PSS 200 is biased to pass the optical signal, leaving it entirely in the original polarization when the optical pump signal $\lambda_p$ 204 is not present, and the optical signal is not switched. As the optical signal 203 enters the first PCC 210 it separates into two mutually perpendicular polarization states, represented as $\lambda_{Sp1}$ and $\lambda_{Sp2}$, each having approximately half the optical power. The signals in the two polarization states pass through the intermediary region 218 of the fiber 205 which is a non-linear region akin to the non-linear regions 135, 140 in FIG. 1. The signals then enter the second PCC 215 which recombines the optical power into a combined optical signal 222. If the pump signal is not present, the combined optical signal 222 is in the original polarization state and is coupled to the first output port 230 and is emitted therefrom as a first output signal 232. If the optical pump signal is present, the combined optical signal 222 is in a second polarization state, orthogonal to the first polarization state, and is switched to the second output port 225 of the PSC 220 and is output therefrom as a second output signal 234. The following discussion is a brief description of how optical power is transferred by the PCC 210, 215.

The transfer of optical power into two polarizations by the PCC 210 is advantageously accomplished using a comb structure that periodically stresses the fiber 205. Such comb structures are shown, for example, in U.S. Pat. No. 4,872, 738, which is incorporated by reference herein. The stress changes the normal polarization states of the optical signal 203 in the fiber 205. If the fiber is stressed over a long section, power is transferred from one polarization to the other during a length equal to one-half the beat length of the two polarizations. Over the next one-half beat length, the power is transferred back to the original polarization. Thus, over a full beat length, no net power is transferred. The comb structure is configured to stress the fiber for one-half beat length and to not stress the fiber for the next one-half beat length. The stressed and unstressed portions are repeated at a periodicity of one beat length. The couplings between the polarizations at each stressed location are cumulative to provide an overall net coupling of energy from one polarization state to the other. The comb is designed to have a number of periodic stress locations to provide an overall nominal coupling of optical power of approximately 50% of the input polarization state to the second polarization state at the optical signal wavelength $\lambda_S$. The optical signal 203 and the pump signal 204 have different wavelengths. Therefore, the beat lengths are different for the pump and the signal. The length of each stressed location is selected so that the pump has nearly zero net coupling. For a PMF 205, the comb is preferably attached at a 45° angle to the main polarization axis for maximum efficiency.

An alternative way to couple light between the two polarizations is to use a permanent optical grating written into a photo-sensitive fiber with a UV laser. See, for example, K. O. Hill, et al., "Bragg Gratings Fabricated in Monomode Photosensitive Optical Fiber by UV Exposure Through a Phase Mask," *Applied Physics Letters,* Vol. 62, No. 10, Mar. 8, 1993, pp. 1035–1037. See also, R. Kashyap, et al., "Wideband Gain Flattened Erbium Fiber Amplifier Using a Photosensitive Fiber Blazed Grating," *Electronic Letters,* Jan. 21, 1993, Vol. 29, No. 2, pp. 154–156. The effect is similar to that of the comb structure. The period of the grating is selected so as to couple approximately 50% of the optical power in the two polarization states at the optical signal 203 wavelength $\lambda_S$. The coupling length is wavelength dependent, and the period of the grating is selected so that the pump signal has a net zero coupling. For the PMF 200, the grating is preferably written at a 45° angle to the principle axis of the fiber for maximum efficiency.

As illustrated in FIG. 2, the first PCC 210 (comb or grating) separates the optical signal from the original polarization into the two mutually perpendicular polarizations shown as $\lambda_{sp}$ and $\lambda_{sp2}$. Then, the second PCC 215 recombines the two polarizations into the combined signal 222. With the proper biasing, when no pump signal 204 is present, all of the optical power returns to the original polarization. In order to switch the power to the second polarization state, the Kerr effect or other nonlinear effect is generated by the pump signal 204 to create a differential phase shift of 180 degrees ($\pi$) between the two polarizations of the optical signal 203. Once this differential phase shift is complete, all of the optical power is coupled by the second PCC 215 into the second polarization state.

The final element of the PSS 200 is a polarization splitting coupler PSC 220 which couples all of the optical signal 203 from the PCC 215 into one of two output ports 225, 230. The selection of which of the two optical ports 225, 230 the optical power goes is controlled by the polarization state of the combined optical signal 222. When the pump is not present and the optical signal 203 is in the original polarization state, the optical signal 203 is coupled to the first output port 230 and is emitted therefrom as a first output signal 232. When the pump is present and the optical signal is in the second polarization state, the optical signal is coupled to the second output port 225. The PSC 220 coupler has a low loss at the pump wavelength. The PSC 220 coupler has good discrimination between the polarizations and also conserves pump power. Substantially all the input pump power (less the pump light consumed in the switching process) is coupled to a pump output port 240 (FIG. 2) and is emitted therefrom as a pump output signal 236. The pump power in the pump output signal 236 may be advantageously provided as an input pump signal to a subsequent switch (not shown) in a sensor array. Polarization splitting couplers which couple light in the perpendicular polarization and which pass light in the parallel polarization and which have the needed wavelength dependence are commercially available, for example, from Canadian Instrumentation and Research Limited, Burlington, Ontario, Canada, as Part No. 918P.

Figure 3:
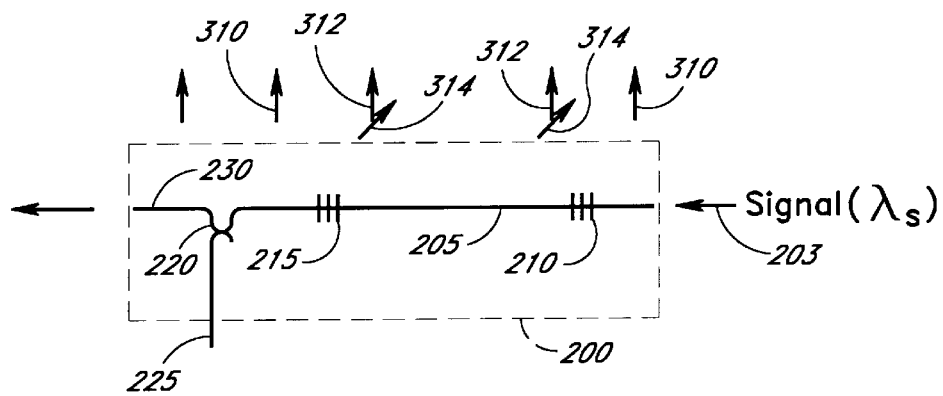
FIG. 3 is a diagrammatic representation of the operation of the all-optical Mach-Zehnder switch of FIG. 2, in a polarization maintaining fiber without a pump pulse present.
Figure 4:
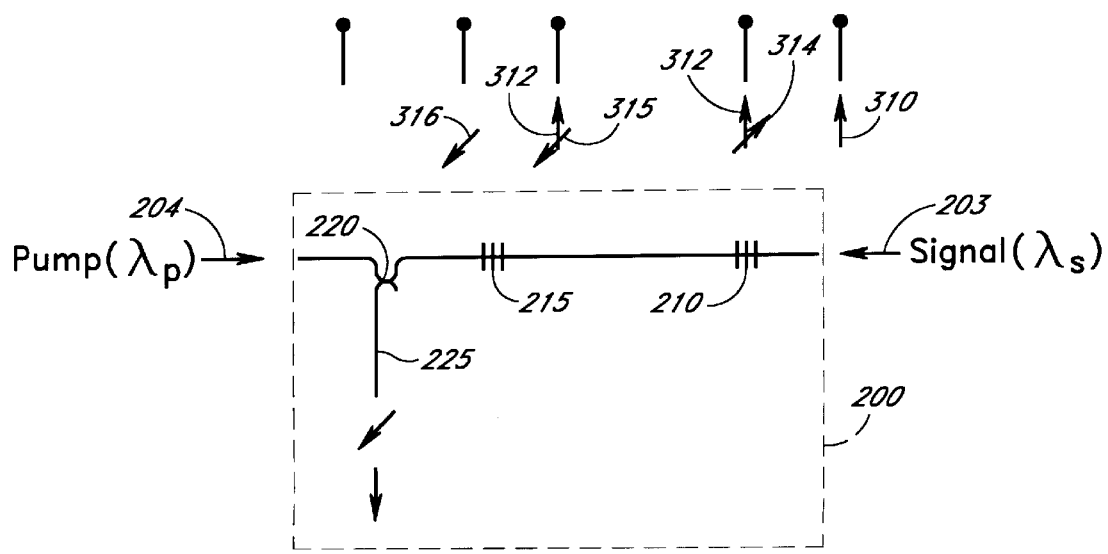
FIG. 4 is a diagrammatic representation of the operation of an all-optical Mach-Zehnder switch in a polarization maintaining fiber with a pump pulse present.

FIGS. 3 and 4 illustrate the operation of the polarization splitting switch in more detail. FIG. 3 illustrates the operation of an exemplary all-optical, fiber, Mach-Zehnder PSS 200 when no optical pump signal 204 is present. The PSS 200 receives the optical signal 203 at the wavelength $\lambda_S$ from an input light source (not shown) in a single polarization 310. The signal enters the PMF 205 and the coupler PCC 210. The first PCC 210 separates the optical signal into two mutually perpendicular polarizations 312, 314. The power is also separated approximately equal in each of the polarization states. The individual polarizations are maintained until the signal reaches the second PCC 215. The second PCC 215 recombines the optical signal 310 into the original polarization state. The optical signal 203 continues to the PSC 220 where the optical signal is not coupled and is fully transmitted by the PSC 220 to the first output port 230 and is emitted therefrom as the first output signal 232. The polarization state for successful switching depends upon the original polarization state of the optical signal 203.

FIG. 4 illustrates the Mach-Zehnder PSS 200 when the optical pump signal 204 is activated. The optical signal 203 enters the first PCC 210 which separates the optical signal 310 into two mutually perpendicular polarization states 312, 314 as before. When the optical pump signal 204 is present, one of the two polarization states (e.g., the state 314) is phase shifted by 180 degrees ($\pi$) as illustrated by a resulting state 315. Once the optical signal reaches the second PCC 215, the two portions 312, 315 of the optical signal with the pump induced relative phase shift are recombined by the PCC 215 into the rotated polarization state 316. This rotated polarization state 316 is orthogonal to the unswitched polarization state 318. Because the polarization of the signal has been rotated to the orthogonal state, the optical signal 203 is coupled by the PSC 220 into the second output port 225 which completes the switching of the optical signal 203.

Figure 5:
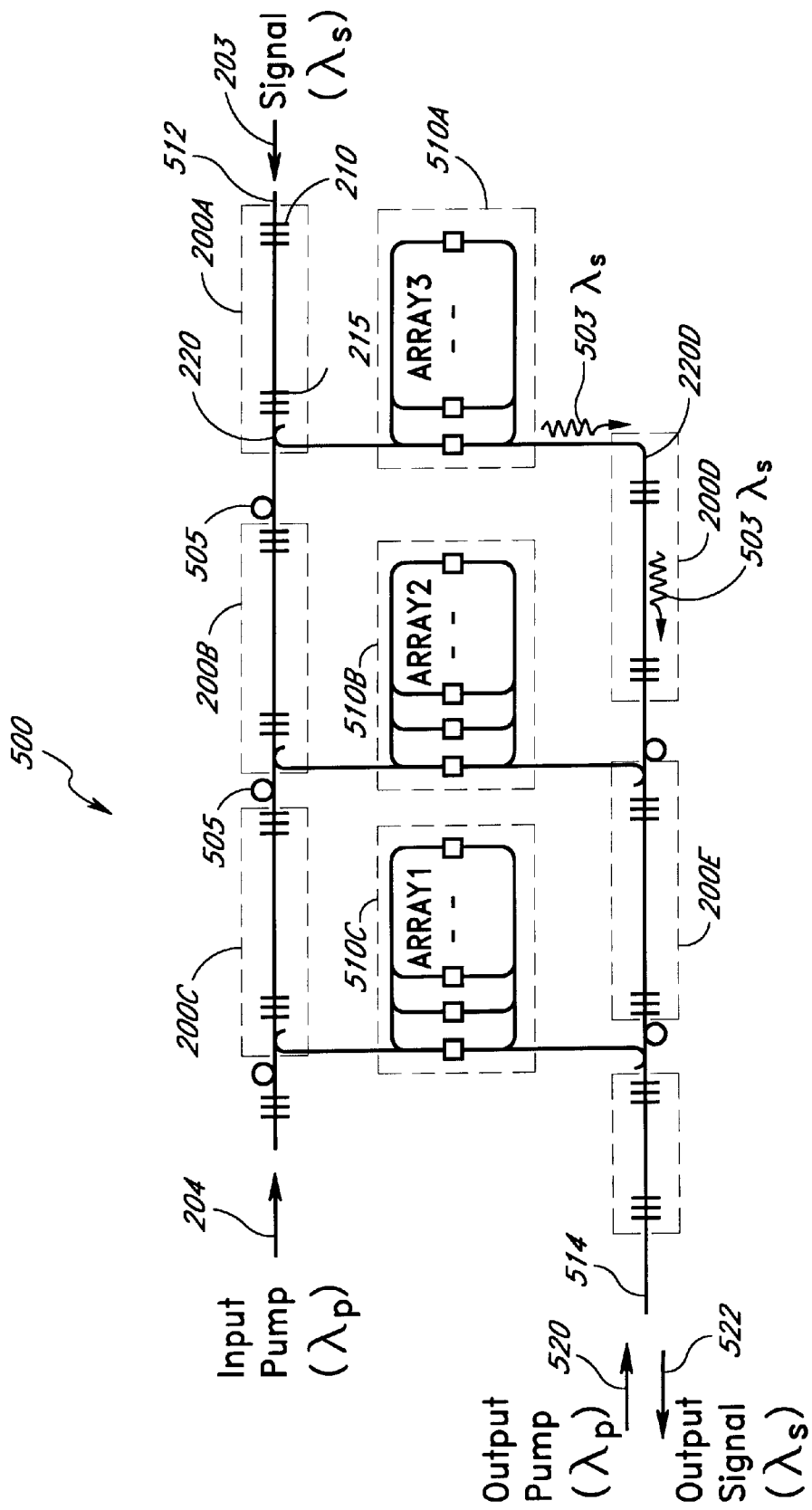
FIG. 5 illustrates a distributed network of Mach-Zehnder type all-optical switches in a polarization maintaining fiber.

FIG. 5 illustrates a network 500 having a ladder structure of distributed switches 200 connected to a plurality of ladder rungs 510, each having one or more sensors which are passively multiplexed in each rung. Preferably, the sensors in each rung 510 are passively multiplexed using a star multiplexer. Although only three arrays 510A, B, C are shown in FIG. 5, a substantially larger number of arrays 510 can be included. The arrays 510 have respective inputs that are coupled to an optical distribution bus 512 by respective polarization splitting switches 200A, B, C in accordance with the present invention. The arrays 510 have respective outputs coupled to an optical return bus 514 by respective polarization splitting switches 200D, E, F. Each of the polarization splitting switches 200 has respective PCCs 210, 215 and a respective intermediary region 218. The optical signal 203 enters the first PSS 200A. When the optical pump signal 204 is present, the optical signal 203 is switched into the passive sensor array 510A via a first coupler 220. When the optical pump signal 204 is not present the optical signal continues on through the first coupler 220A to the next PSS 200B. A delay line 505 is interposed between each PSS 200 in order to provide appropriate timing of the optical pump signal 204 with respect to the optical signal 203. Such timing is described, for example, in U.S. Pat. No. 5,267,244 to H. J. Shaw. The optical pump signal 204 is pulsed so that only one PSS 200 is active at any one time. Therefore, only one passive sensor array 510 receives the input optical signal 203 at any one time. Once the optical signal 503 passes through one of the passive sensor arrays 510, the optical signal 503 exits to the optical return bus 514 via a respective switch 200D, E, F.

Figure 6:
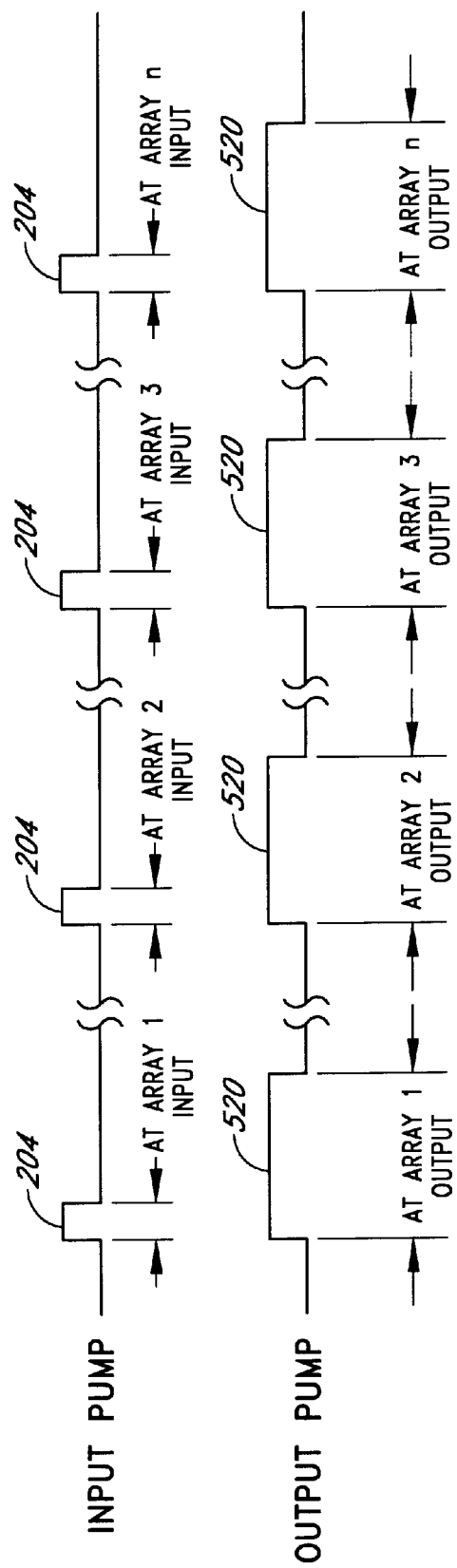
FIG. 6 illustrates the relationship between the input pump signal and the output pump signal for the distributed network of FIG. 5.

The optical pump signal 204 is preferably provided to the optical distribution bus 512 as a series of input pump pulses 204 and to the optical return bus 514 as a series of synchronous output pump pulses 520, as illustrated in FIG. 6. The input pump pulses 204 have an input pump width (IPW) and the output pump pulses 520 have an output pump width (OPW). The input pump pulses 204 and the output pump pulses 520 are delayed as they propagate down the respective buses so that they arrive at the respective switches 200 at different times. In particular, the input pump pulse 204 arrives at the switch 200C after a delay (DELAY) determined by the delay 505. As described above, the pulse 530 causes the switch 200C to route the input signal through rung 1 510C as a RUNG 1 SIGNAL IN 530. After respective subsequent delays, the input pump pulse arrives at the switch 200B to cause the input signal to be routed through rung 2 510B as a RUNG 2 SIGNAL IN 531. Thereafter, the pump pulse arrives at the switch 500A and causes the input signal to be routed through the rung 3 510A as a RUNG 3 SIGNAL IN 532. After a short sensor delay (indicated as SD in FIG. 6), the signal is output from rung 1 510C as a series of output pulses (RUNG 1 SIGNAL OUT) 540. Each of the output pulses 540 is generated by a respective sensor in rung 1 510C. Each pulse has approximately the same duration as the input pulse 530, and each pulse is separated from the previous pulse by a small delay referred to as a guardband (GB). The guardband is provided by making the differences in path lengths through each sensor in rung 1 510C sufficient that the pulse generated by the sensor having the shortest path length is completely output and the guardband (GB) delay has elapsed before the pulse generated by the sensor having the next longest path length, and so on. In FIG. 6, five output pulses from each of the rungs 510A, 510B and 510C are shown, representing five sensors in each rung. It should be understood that more or fewer sensors can be provided in each rung.

The output pump signal is timed to arrive at the respective output switches 200F, 200E, 200D when the output signals arrive at the output of each of the rungs 510C, 510B, 510A. This is accomplished by passing the pump signal through corresponding delays 505. In addition, the pump signal may be delayed by a small amount to accommodate the propagation delay through the shortest sensor path in each rung. This may be accomplished by including extra delay in the delay 505 before the first return bus switch 200F or by delaying the output pump by the amount of the sensor delay (SD), as shown in FIG. 6. Each output pump pulse 520 has a duration (i.e., OPW) selected to be at least as long as the total duration of the signal output pulses from the rungs 510A, 510B, 510C. In the example presented of three rungs and five sensors per rung, the duration (OPW) of the pump pulses 520 will be slightly greater than five times the sum of the input pump duration (IPW) and the guardband (GB) (i.e., OPW>5×(IPW+GB)).

The first delay 505 is selected to cause the output pump pulse 520 to arrive at the switch 200F as an ENABLE RUNG 1 OUT pulse 550 at the same time that the signal output pulses 540 are output from the rung 1 510C. Thus, the switch 200F is enabled to route the pulses 540 onto the return bus 514. Similarly, after additional delay, the pump pulse 520 arrives at the switch 200E as an ENABLE RUNG 2 OUT pulse 551 and then arrives at the switch 200D as an ENABLE RUNG 3 OUT pulse 552.

The signal pulses from each of the rungs 510A, 510B, 510C are in the second polarization state. When the output pump pulse is present at a particular output switch 200 (e.g., the output switch 200D), the optical signal from the respective array (e.g., the rung 3 510A) is coupled from the second polarization state to the first polarization in the output switch 200D. Otherwise, if the output pump pulse is not present, the signals remain in the second polarization state.

If the pump pulse is present at the switch 200D, the signal is coupled to the first polarization state and propagates on the return bus 514 in the first polarization state. When the signal arrives at the switch 200E and subsequently to the switch 200F, there is no pump pulse present and no coupling occurs. Thus, the signal continues to propagate through the switches to the output of the return bus 512. On the other hand, if the pump is not present at the switch 200D when the signal is output from the rung 3, the signal remains in the second polarization. Thus, when the signal arrives at the switch 200E in the second polarization, it is coupled to the unused output port and is thereby discarded so that it does not continue to propagate to the output of the return bus 514. Any signal in the second polarization state which reaches the output of the return bus 514 is advantageously blocked by a polarization filter 590. Alternatively, a detector (not shown) is selected which does not detect light in the second polarization state.

The rung 1 output pulses 520 propagate through one delay 505 on the return bus 514 and are provided as a series of output pulses 560 approximately one DELAY time later. The rung 2 output pulses 521 propagate through two delays 505 on the return bus 514 and are provided as a series of output pulses 561 approximately two DELAY times later. The rung 3 output pulses 522 propagate through three delays 505 on the return bus 514 and are provided as a series of output pulses 562 approximately three DELAY times later. Although the pulses 540, 541 and 542 overlap in time when generated, the cumulative effect of the delay in the generation of the rung 2 output pulses 521 and the rung 3 output pulses 522 and the delay in propagating the output pulses through the return bus 514 cause the output pulses to be separated in time when the pulses arrive at the output of the return bus 514. Rather, the output pulses are provided on the output of the return bus 514 as a continuous stream of pulses separated only by small delays to assure that the pulses do not overlap.

Because the output signals have a longer total duration than the input pump pulses 204, the input pump pulses 204 must be spaced apart by a PUMP PERIOD selected so that the first output signal pulses caused by the second input pump pulse 204 do not overlap with the last output signal pulses caused by the first input pump pulse 204. Thus, the input pump pulses 204 are spaced apart by a PUMP PERIOD equal to 2×DELAY×N, where N is the number of rungs. As discussed above, DELAY is selected to be sufficiently long to assure that the signals from one rung are generated and output before the signals from the next rung begin to be output. Thus, DELAY is selected to be slightly more than one-half the duration of each series of pump pulses. By selecting the PUMP PERIOD in accordance with this criteria, the output signals from RUNG 1 510C caused by the second input pump pulse 204 are output as a series of pulses 563 which follow immediately after the output pulses 562 caused by the previous input pump pulse.

By the foregoing manner, the optical signal can be selectively distributed through each passive sensor array and recovered therefrom for data analysis. By timing the pump pulses so that only one input switch 200 and only a corresponding one output switch 200 are active at the same time, the signals from each array 510 can be analyzed separately.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. An optical polarization based switch comprising:

a first polarization cross coupler that receives an input optical signal and that generates an intermediate optical signal from said input optical signal by dividing optical power in said input optical signal into a first polarization state and a second polarization state;

an optical medium that receives said intermediate optical signal and that receives an optical pump signal, said optical medium responding to the pump signal to affect the optical power in said first polarization state differently than the optical power in said second polarization state;

a second polarization cross coupler in communication with said optical medium to receive said intermediate optical signal, said second polarization cross coupler generating a combined optical signal by recombining optical power in said first and second polarization states, said combined optical signal having a polarization responsive to the presence or absence of the optical pump signal in said optical medium; and a polarization dependent coupler that couples said combined optical signal into an output waveguide when said polarization of said combined optical signal has a preferred polarization state.

2. The switch of claim 1, wherein said optical medium comprises a polarization maintaining waveguide between said first polarization cross coupler and said second polarization cross coupler for receiving said intermediate optical signal from said first polarization cross coupler and communicating said intermediate optical signal to said second polarization cross coupler.

3. The switch of claim 1, further comprising a switchable optical pump light source that generates said optical pump signal, said optical pump signal having an on state and an off state.

4. The switch of claim 1, wherein said first polarization cross coupler, said second polarization cross coupler and said polarization dependent coupler are constructed from optical fiber.

5. The switch of claim 4, wherein said optical fiber comprises a single continuous fiber strand.

6. The switch of claim 4, wherein said optical fiber comprises a polarization maintaining fiber.

7. The switch of claim 1, wherein said input optical signal comprises a polarized signal.

8. The switch of claim 1, wherein said first polarization state and said second polarization state are mutually orthogonal polarization states.

9. The switch of claim 1, wherein said output waveguide is a first output waveguide, said switch further including a second output waveguide, said polarization dependent coupler coupling said combined optical signal into said second output waveguide when said polarization of said combined optical signal does not have said preferred polarization state.

10. The switch of claim 1, wherein said intermediate optical signal propagates in said optical medium in a first direction, and wherein said optical pump signal propagates in said optical medium in a second direction opposite said first direction.

11. A method for switching an optical signal in response to an optical pump signal, the method comprising:

splitting the optical signal into a first signal portion having a first polarization and a second signal portion having a second polarization, said first signal portion and said second signal portion having approximately equal optical power;

selectively causing a phase change in said first signal portion relative to said second signal portion when said optical pump signal is present;

combining said first signal portion and said second signal portion into a combined optical signal, said combined optical signal having a combined polarization responsive to said phase change, said combined polarization having a first state when said optical pump signal is present and having a second state when said optical pump signal is not present; and selectively outputting said combined optical signal when said combined polarization state is a preferred one of said first state and said second state.

12. The method for switching an optical signal as defined in claim 11, wherein said splitting is performed by a polarization cross coupler formed by mechanically stressing a polarization maintaining fiber periodically.

13. The method for switching an optical signal as defined in claim 11, wherein said splitting is performed by a polarization cross coupler comprising an optical grating formed periodically within a polarization maintaining fiber.

14. A The method for switching an optical signal as defined in claim 11, wherein said outputting is performed using a polarization splitting coupler to couple the combined optical signal to an output waveguide when said combined polarization has said first state and to not couple the combined optical signal to said output waveguide when said combined polarization has said second state.

15. The method for switching an optical signal as defined in claim 11, wherein said first signal portion and said second signal portion propagate in an optical medium in a first direction, and wherein said optical pump signal propagates in said optical medium in a second direction opposite said first direction.

16. A system for switching an optical signal in response to an optical pump signal, the system comprising:

means for splitting the optical signal into a first signal portion having a first polarization and a second signal portion having a second polarization, said first signal portion and said second signal portion having approximately equal optical power;

means for selectively causing a phase change in said first signal portion relative to said second signal portion when said optical pump signal is present;

means for combining said first signal portion and said second signal portion into a combined optical signal, said combined optical signal having a combined polarization responsive to said phase change, said combined polarization having a first state when said optical pump signal is present and having a second state when said optical pump signal is not present; and means for selectively outputting said combined optical signal when said combined polarization state is a preferred one of said first state and said second state.

17. The system as defined in claim 14, wherein said means for splitting comprises a polarization cross coupler formed by mechanically stressing a polarization maintaining fiber periodically.

18. The system as defined in claim 16, wherein said means for splitting comprises a polarization cross coupler comprising an optical grating formed periodically within a polarization maintaining fiber.

19. The system as defined in claim 16, wherein said means for selectively outputting comprises a polarization dependent coupler, said polarization dependent coupler coupling the combined optical signal to an output waveguide when said combined polarization has said first state, said polarization dependent coupler not coupling the combined optical signal to said output waveguide when said combined polarization has said second state.

20. The system as defined in claim 19, wherein said output waveguide is a first output waveguide, said system further including a second output waveguide, said polarization dependent coupler coupling said combined optical signal into said second output waveguide when said combined polarization has said second state.

* * * * *